United States Patent
Kim et al.

(10) Patent No.: US 8,989,581 B2
(45) Date of Patent: Mar. 24, 2015

(54) WAVELENGTH REASSIGNMENT IN OPTICAL NETWORKS

(75) Inventors: Inwoong Kim, Allen, TX (US); Paparao Palacharla, Richardson, TX (US); Xi Wang, Murphy, TX (US); Motoyoshi Sekiya, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 325 days.

(21) Appl. No.: 13/427,754

(22) Filed: Mar. 22, 2012

(65) Prior Publication Data
US 2013/0251368 A1    Sep. 26, 2013

(51) Int. Cl.
*H04J 14/02*   (2006.01)
*H04B 10/572*   (2013.01)

(52) U.S. Cl.
CPC .................. *H04B 10/572* (2013.01)
USPC .................. 398/79; 398/48; 398/76

(58) Field of Classification Search
CPC ............. H04Q 2011/0009; H04Q 2011/0011; H04Q 2011/0018; H04Q 10/61; H04Q 10/63
USPC .................... 398/47–50, 58, 76, 79
See application file for complete search history.

(56) References Cited

U.S. PATENT DOCUMENTS 5,991,477 A * 11/1999 Ishikawa et al. ............. 385/24
6,417,942 B1 * 7/2002 Seto et al. .................... 398/5
2002/0105693 A1 * 8/2002 Kobayashi et al. .......... 359/124
2004/0184807 A1 * 9/2004 Aso et al. ..................... 398/85
2005/0249495 A1 * 11/2005 Beshai et al. ................. 398/45
2007/0098405 A1 * 5/2007 McEwan et al. .............. 398/58
2012/0201541 A1 * 8/2012 Patel et al. ................... 398/58

OTHER PUBLICATIONS

J. Yu and M. Huang, Wavelength Conversion for 112Gbit/s PolMux-RZ-QPSK Signals Based on Four-Wave Mixing in High-Nonlinear Fiber Using Digital Coherent Detection, ECOC 2008, Mo.3.C.5, vol. 1, pp. 27-28.
X. Wu, Tunable optical wavelength conversion of OFDM signal using a periodically-poled lithium niobate waveguide, optics express 2009.

* cited by examiner

*Primary Examiner* — Dzung Tran
(74) *Attorney, Agent, or Firm* — Maschoff Brennan

(57) ABSTRACT

An optical network for reassigning a carrier wavelength of an optical signal may include first and second optical nodes. The first optical node may be configured to transmit an optical signal along an optical path. The first optical node may also be configured to tune a carrier wavelength of the optical signal from a first wavelength to a second wavelength, according to a continuous function, to reassign the carrier wavelength of the optical signal. The second optical node may be configured to receive the optical signal and may include a feedback loop configured to adjust a wavelength of a reference optical signal to approximate the carrier wavelength of the optical signal.

20 Claims, 9 Drawing Sheets

US 8,989,581 B2

WAVELENGTH REASSIGNMENT IN OPTICAL NETWORKS

FIELD

The embodiments discussed herein are related to optical networks.

BACKGROUND

Some optical networks may use wavelength-division multiplexing to multiplex multiple optical signals onto a single optical fiber. The different optical signals may use different carrier wavelengths of light to carry their respective signals within a respective wavelength channel in the single optical fiber. For example, a single optical fiber may contain eight different wavelength channels, each corresponding to a different one of eight optical signals.

In some circumstances, one or more of the optical signals may be reassigned to a different carrier wavelength, and therefore a different channel, while the optical signal is transmitting data. To avoid data loss, the optical network may use a bridge-and-roll technique to reassign the carrier wavelength of the optical signal. To employ the bridge-and-roll technique, the optical network may use two transmitter and receiver pairs operating at different wavelengths. For example, a first transmitter and receiver pair may transmit an optical signal at a first wavelength. To reassign the optical signal to a second wavelength, the optical network may begin transmitting the optical signal at the second wavelength using a second transmitter and receiver pair. After establishing the optical signal at the second wavelength using the second transmitter and receiver pair, the optical network may end transmitting the optical signal at the first wavelength. In this manner, the optical network may reassign a carrier wavelength of an optical signal using the bridge-and-roll technique.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, an optical network for reassigning a carrier wavelength of an optical signal may include first and second optical nodes. The first optical node may be configured to transmit an optical signal along an optical path. The first optical node may also be configured to tune a carrier wavelength of the optical signal from a first wavelength to a second wavelength, according to a continuous function, to reassign the carrier wavelength of the optical signal. The second optical node may be configured to receive the optical signal and may include a feedback loop configured to adjust a wavelength of a reference optical signal to approximate the carrier wavelength of the optical signal.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described herein include an optical network for reassigning a carrier wavelength of an optical signal. In some embodiments, the optical network may include an optical source node, which may include a transmitter, the optical source node may be configured to transmit an optical signal within the optical network at a first wavelength. To reassign the carrier wavelength of the optical signal to a second wavelength, the optical source node may be configured to tune the carrier wavelength of the optical signal from the first wavelength to the second wavelength according to a continuous function. Tuning the carrier wavelength of the optical signal according to a continuous function may cause the carrier wavelength of the optical signal to traverse the wavelength range between the first wavelength and the second wavelength.

The optical network may also include an optical destination node, which may include a receiver, the optical destination node may be configured to receive the optical signal from the optical source node. In some embodiments, the optical destination node may be a coherent receiver that includes a reference optical signal used to demodulate the optical signal. In some embodiments, the optical destination node may include a feedback loop configured to adjust a wavelength of the reference optical signal to approximate the carrier wavelength of the optical signal.

By tuning the carrier wavelength of the optical signal according to a continuous function and adjusting the wavelength of the reference optical signal to approximate the carrier wavelength of the optical signal, the optical network may reassign the carrier wavelength of the optical signal using a single optical source node and optical destination node pair with limited or no interruption of data flow or data loss.

Embodiments of the present invention will be explained with reference to the accompanying drawings.

Figure 1A:
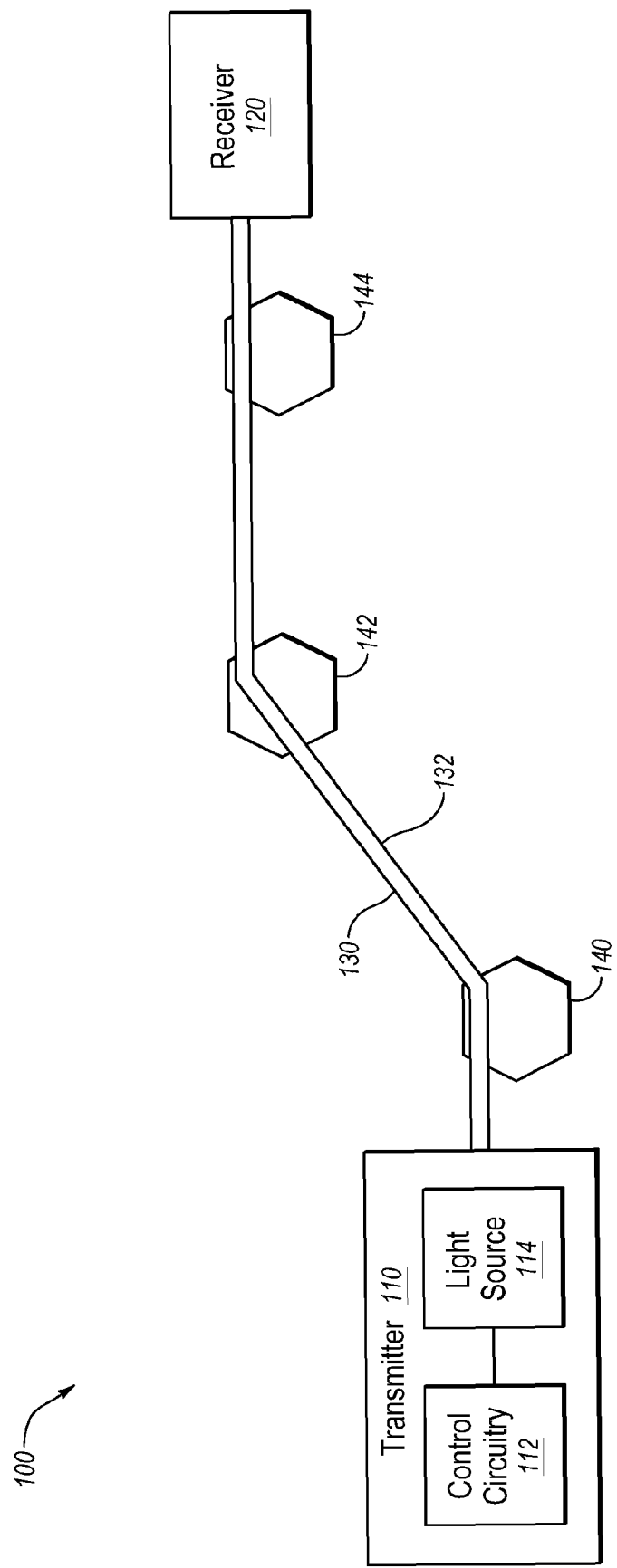
FIG. 1A is a block diagram of an example optical network for reassigning a carrier wavelength of an optical signal.

FIG. 1A is a block diagram of an example optical network 100 for reassigning a carrier wavelength of an optical signal 130, arranged in accordance with at least some embodiments described herein. The optical network 100 may include a transmitter 110, a receiver 120, and optical nodes 140, 142, 144. An optical path 132 may be formed between the transmitter 110 and the receiver 120 through the optical nodes 140, 142, 144 along which the optical signal 130 may travel. In some embodiments, the transmitter 110 may include control circuitry 112 and a light source 114. The light source 114 may be configured to produce the optical signal 130 under the control of the control circuitry 112.

The transmitter 110 may be in an optical node, such as an optical source node, and may be configured to tune the carrier wavelength of the optical signal 130 from a first wavelength to a second wavelength to reassign the carrier wavelength of the optical signal within the optical network 100. The optical network 100 may allow multiple optical signals to be transmitted along the optical path 132 at varying wavelengths. Reassigning the carrier wavelength of the optical signal 130 may include changing the carrier wavelength of the optical signal 130 from the first wavelength to the second wavelength along the optical path 132 so that another optical signal may use the first wavelength along the optical path 132 within the optical network 100. For example, in some embodiments, the optical signal 130 may initially have a wavelength, e.g., a first wavelength of 1,552.5 nanometers. The transmitter 110 may tune the carrier wavelength of the optical signal 130 to allow another optical signal to be transmitted at a wavelength of 1,552.5 nanometers.

In some embodiments, the transmitter 110 may tune the carrier wavelength of the optical signal 130 using the control circuitry 112 and the light source 114. More specifically, the control circuitry 112 may change the wavelength of the light source 114 to change the carrier wavelength of the optical signal 130. In some embodiments, the light source 114 may be a tunable laser. Alternately or additionally, the light source 114 may be a mode-hop-free tunable laser.

In some embodiments, the transmitter 110 may tune the carrier wavelength of the optical signal 130 according to a continuous function. Tuning the carrier wavelength of the optical signal 130 according to a continuous function may cause the carrier wavelength of the optical signal 130 to traverse the wavelength range between the first wavelength and the second wavelength in a substantially continuous manner. In these and other embodiments, tuning the carrier wavelength of the optical signal 130 according to a continuous function may include the carrier wavelength of the optical signal 130 not hopping across multiple wavelengths as the carrier wavelength of the optical signal 130 is tuned from the first wavelength to the second wavelength.

In some embodiments, the transmitter 110 may be configured to modulate the carrier wavelength of the optical signal 130 with a data signal. More specifically, the transmitter 110 may be configured to modulate the amplitude, phase, or both of the carrier wavelength of the optical signal 130. In some embodiments, the transmitter 110 may modulate the carrier wavelength of the optical signal 130 using modulation formats such as differential phase-shift keying, on-off keying, binary phase-shifting keying, quadrature phase-shift keying, offset quadrature phase-shift keying, dual polarization quadrature phase-shift keying, M-ary quadrature amplitude modulation, orthogonal frequency division multiplexing, among others.

The receiver 120 may be in an optical node, such as an optical destination node, and may be configured to receive the optical signal 130. In some embodiments, the receiver 120 may be a coherent receiver and may generate a reference optical signal. The receiver 120 may use the reference optical signal to demodulate the optical signal 130 to obtain the data signal. In some embodiments, the receiver 120 may adjust a wavelength of the reference optical signal to approximate the carrier wavelength of the optical signal 130 as the carrier wavelength of the optical signal 130 is tuned. Having the wavelength of the reference optical signal approximate the carrier wavelength of the optical signal 130 may assist in demodulating the optical signal 130.

The optical nodes 140, 142, 144 disposed in the optical path 132 between the transmitter 110 and receiver 120 may have varying or the same optical pass-through bandwidths. The optical pass-through bandwidths of the optical nodes 140, 142, 144 may indicate a wavelength of an optical signal that the optical nodes 140, 142, 144 may pass without filtering or attenuating the optical signal. In some embodiments, the optical nodes 140, 142, 144 may have optical pass-through bandwidths that encompass the first and second wavelengths to allow the optical nodes 140, 142, 144 to pass the optical signal 130 as it is tuned from the first wavelength to the second wavelength. Alternately or additionally, the optical nodes 140, 142, 144 may have adjustable optical pass-through bandwidths, which may be adjusted based on the carrier wavelength of the optical signal 130 to allow the optical signal 130 to pass along the optical path 132 without being filtered or attenuated.

The optical nodes 140, 142, 144 may all be the same type of optical nodes, different types of optical nodes, or some combination of different types of optical nodes. Furthermore, the optical nodes 140, 142, 144 may be reconfigurable optical add-drop multiplexers that are colorless, directionless, contentionless, gridless, or some combination thereof. In some embodiments, one or more of the optical nodes 140, 142, 144 may have a filter, tunable filter, wavelength selective switch (WSS), variable-bandwidth wavelength selective switch (VB-WSS), or optical amplifier. Alternately or additionally, one or more of the optical nodes 140, 142, 144 may have an optical wavelength converter. Although the embodiment of FIG. 1A includes three optical nodes 140, 142, 144, in other embodiments, the number of optical nodes in the optical network 100 may be more or less than three.

In some embodiments, the optical network 100 may be an optical fiber network that uses optical fibers as the medium for transmitting the optical signal 130. In some embodiments, the transmitter 110 and the receiver 120 may be transceivers, transponders, or some combination thereof. Alternately or additionally, the transmitter 110 and the receiver 120 may be some other elements in the optical network 100 that are configured to perform the functions described herein.

Figure 1B:
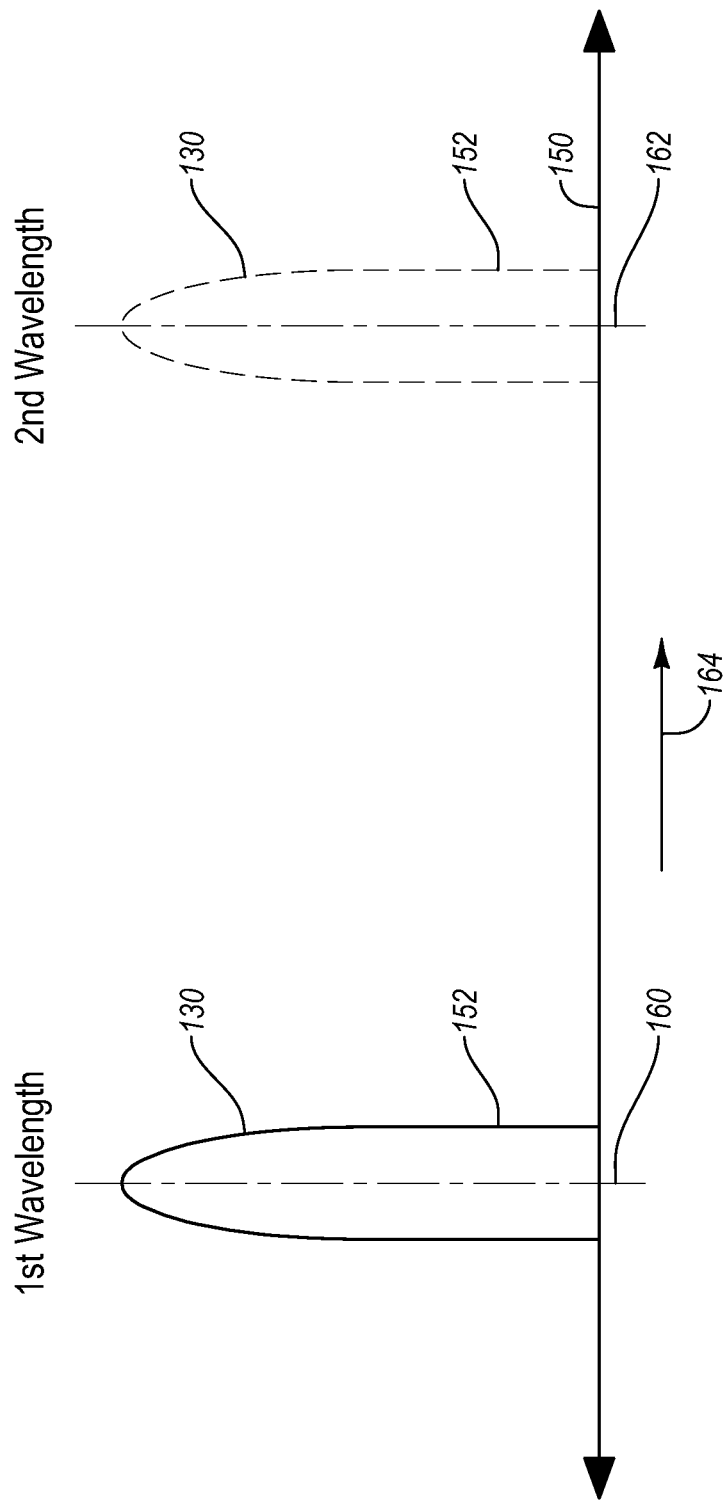
FIG. 1B illustrates the reassignment of the carrier wavelength of the optical signal of FIG. 1A in an optical spectrum.

FIG. 1B illustrates the reassignment of the carrier wavelength of the optical signal 130 of FIG. 1A in an optical spectrum 150, arranged in accordance with at least some embodiments described herein. Before being tuned, the optical signal 130 may have a carrier wavelength at a first wavelength 160. In some embodiments, the optical signal 130 may have a spectral width as illustrated by an optical signal spectrum 152. As the carrier wavelength of the optical signal 130 is tuned, the carrier wavelength of the optical signal 130 moves in a continuous fashion in the direction of arrow 164 toward a second wavelength 162 in the optical spectrum 150. After being tuned to the second wavelength 162, the carrier wavelength of the optical signal 130 may be equal to the second wavelength 162.

Figure 2:
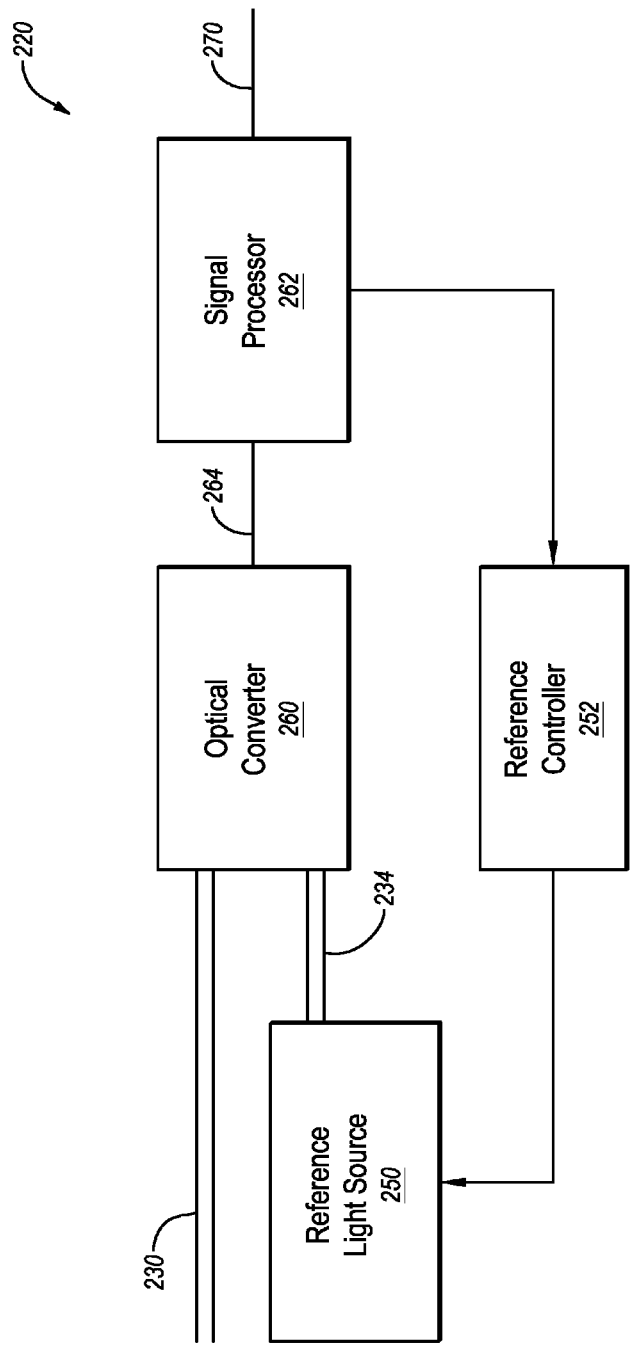
FIG. 2 is a block diagram of an example receiver for receiving an optical signal.

FIG. 2 is a block diagram of an example receiver 220 for receiving an optical signal 230, arranged in accordance with at least some embodiments described herein. The optical signal 230 of FIG. 2 may correspond to the optical signal 130 of FIGS. 1A-1B, for example. The receiver 220 may be a coherent receiver and may be configured to receive an optical signal 230 and demodulate the optical signal 230 to obtain a data signal 270. The receiver 220 may include a reference light source 250 configured to generate a reference optical signal 234, a reference controller 252, an optical converter 260, and a signal processor 262.

The optical converter 260 may receive the optical signal 230 and the reference optical signal 234 and be configured to convert the optical signal 230 to an unprocessed data signal 264 that is sent to the signal processor 262. In some embodiments, the optical converter 260 may include optical elements, such as, polarization-diversity optical hybrids, used to obtain different vectorial additions of the optical signal 230 and the reference optical signal 234. The interference signal of the vectorial additions may be detected by balanced optical receivers, such as photodiodes, and converted to analog electrical signals. The analog electrical signals may be converted to digital signals using analog to digital converters. The digital signals may be sent to the signal processor 262 as the unprocessed data signal 264.

The signal processor 262 may be configured to receive the unprocessed data signal 264 and process the unprocessed data signal 264 to produce the data signal 270. The signal processor 262 may include one or more modules to process the unprocessed data signal 264. For example, the signal processor 262 may include a digital signal processor, a general microprocessor, a processor, field-programmable gate array (FPGA), some other computational unit(s) or digital logic, or some combination thereof. In some embodiments, the signal processor 262 may process the unprocessed data signal 264 by equalizing the data signal, compensating for frequency offset or wavelength offset between the optical signal 230 and the reference optical signal 234, and/or performing phase and data recovery of the optical signal 230.

In some embodiments, the signal processor 262 may be configured to generate and send an error signal indicating a frequency offset or wavelength offset between the carrier wavelength of optical signal 230 and the reference optical signal 234 to the reference controller 252. The reference controller 252 may be configured to control the reference light source 250 to adjust the wavelength of the reference optical signal 234 to approximate the carrier wavelength of the optical signal 230. The optical converter 260, the signal processor 262, the reference controller 252, and the reference light source 250 may operate as a feedback loop within the receiver 220 to adjust the wavelength of the reference optical signal 234.

In some embodiments, the receiver 220 may be part of an optical network that includes a transmitter, such as the transmitter 110 of FIG. 1A, that tunes the carrier wavelength of the optical signal 230 from a first wavelength to a second wavelength. In these and other embodiments, the receiver 220 may operate to adjust the wavelength of the reference optical signal 234 based on the changing carrier wavelength of the optical signal 230 as it is tuned. By adjusting the wavelength of the reference optical signal 234, the wavelength of the reference optical signal 234 may be tuned at the same rate as the carrier wavelength of the optical signal 230. Because the wavelength of the reference optical signal 234 is tuned at the same or substantially the same rate as the carrier wavelength of the optical signal 230, the receiver 220 may demodulate the optical signal 230 as the carrier wavelength of the optical signal 230 is tuned with reduced or no data loss or data interruption compared to some systems in which wavelength is not tuned according to a continuous function. In some embodiments, the carrier wavelength of the optical signal 230 is tuned at a rate that allows the receiver 220 to adjust the reference optical signal 234 to approximate the carrier wavelength of the optical signal 230 and to demodulate the optical signal 230.

In some embodiments, the receiver 220 may be part of a transceiver or a transponder in an optical network. In some embodiments, the reference light source 250, may be a local-oscillator laser, such as a tunable laser. Alternately or additionally, the reference light source 250 may be a mode-hop-free tunable laser.

Figure 3A:
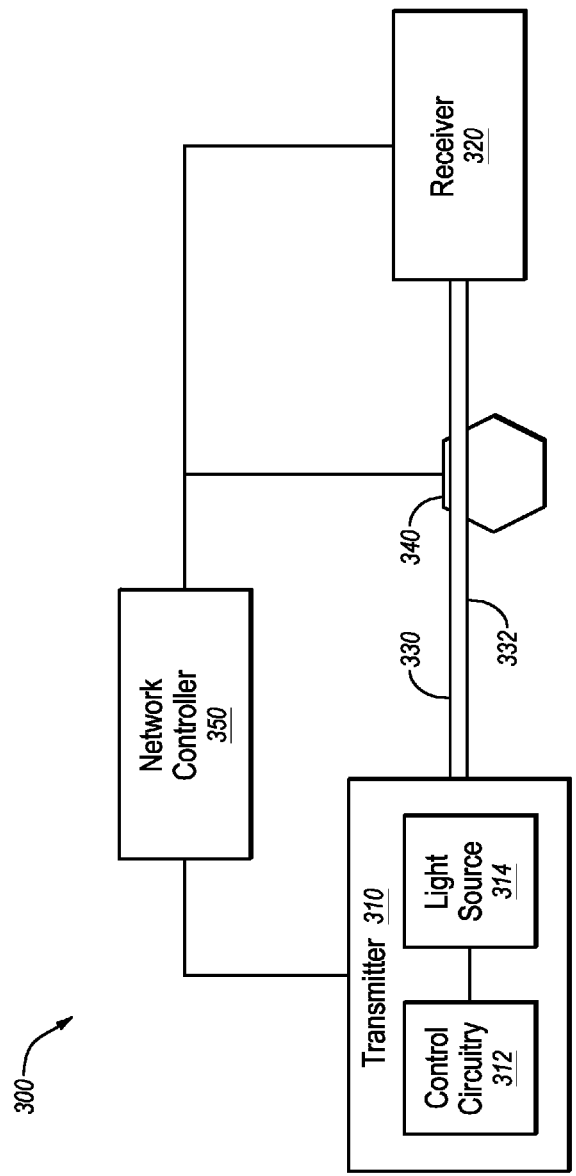
FIG. 3A is a block diagram of another example optical network for reassigning a carrier wavelength of an optical signal.

FIG. 3A is a block diagram of another example optical network 300 for reassigning a wavelength of an optical signal 330, arranged in accordance with at least some embodiments described herein. The optical network 300 may include various optical nodes, including but not limited to, a transmitter 310, a receiver 320, an optical node 340, and a network controller 350. An optical path 332 may be formed between the transmitter 310 and the receiver 320 through the optical node 340 along which the optical signal 330 may travel. In some embodiments, the transmitter 310 may include control circuitry 312 and a light source 314. The light source 314 may be configured to produce the optical signal 330 under the control of the control circuitry 312.

In some embodiments, the network controller 350 may be configured to direct the transmitter 310 to tune a carrier wavelength of the optical signal 330 from a first wavelength to a second wavelength to reassign the carrier wavelength of the optical signal 330 within the optical network 300. Alternately or additionally, the receiver 320 may be configured to receive the optical signal 330 and demodulate the optical signal 330 to obtain a data signal. In some embodiments, the transmitter 310 and the receiver 320 may be transceivers, transponders, or some combination thereof.

The network controller 350 may also be configured to direct the optical node 340 to adjust an optical pass-through bandwidth of the optical node 340 based on the carrier wavelength of the optical signal 330. As the transmitter 310 tunes the carrier wavelength of the optical signal 330 under the direction of the network controller 350, the network controller 350 may also send updates of the changing wavelength to the optical node 340 to allow the optical node 340 to adjust its optical pass-through bandwidth so that the optical signal 330 is not attenuated or filtered by the optical node 340.

Figure 3B:
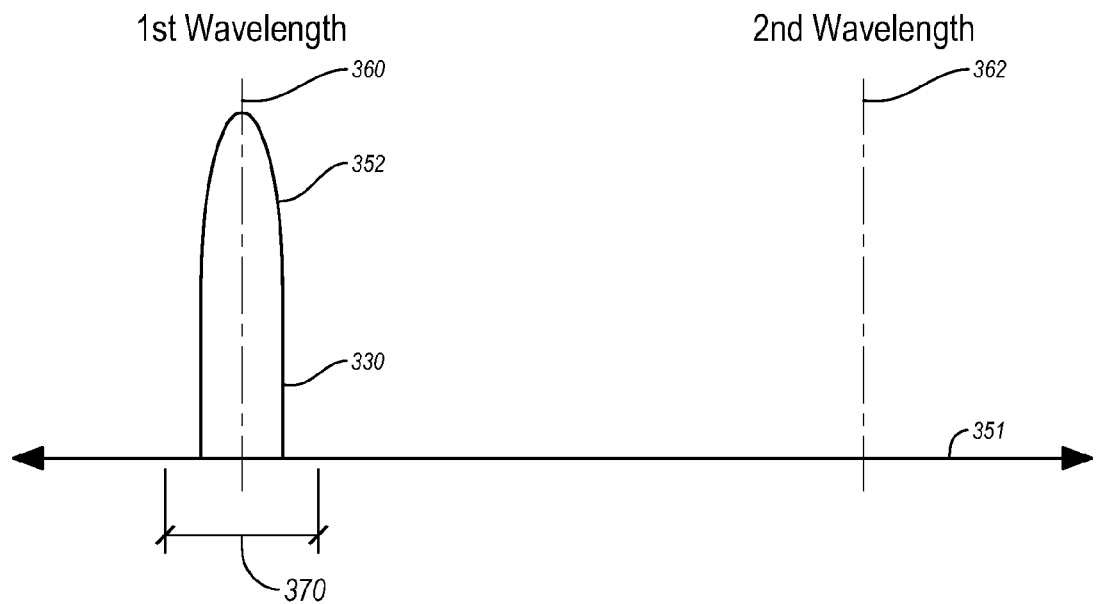
FIGS. 3B-3E illustrate the optical pass-through bandwidth of an optical node in the optical network of FIG. 3A in an optical spectrum.

FIG. 3B illustrates an optical pass-through bandwidth 370 of the optical node 340 of FIG. 3A in an optical spectrum 351, arranged in accordance with at least some embodiments described herein. FIG. 3B also illustrates, a carrier wavelength of the optical signal 330 at a first wavelength 360 before the optical signal 330 is tuned. In some embodiments, the optical signal 330 may have a spectral width as illustrated by an optical signal spectrum 352. The optical pass-through bandwidth 370 of the optical node 340 is configured to encompass the optical spectrum used by the optical signal 330.

Figure 3C:
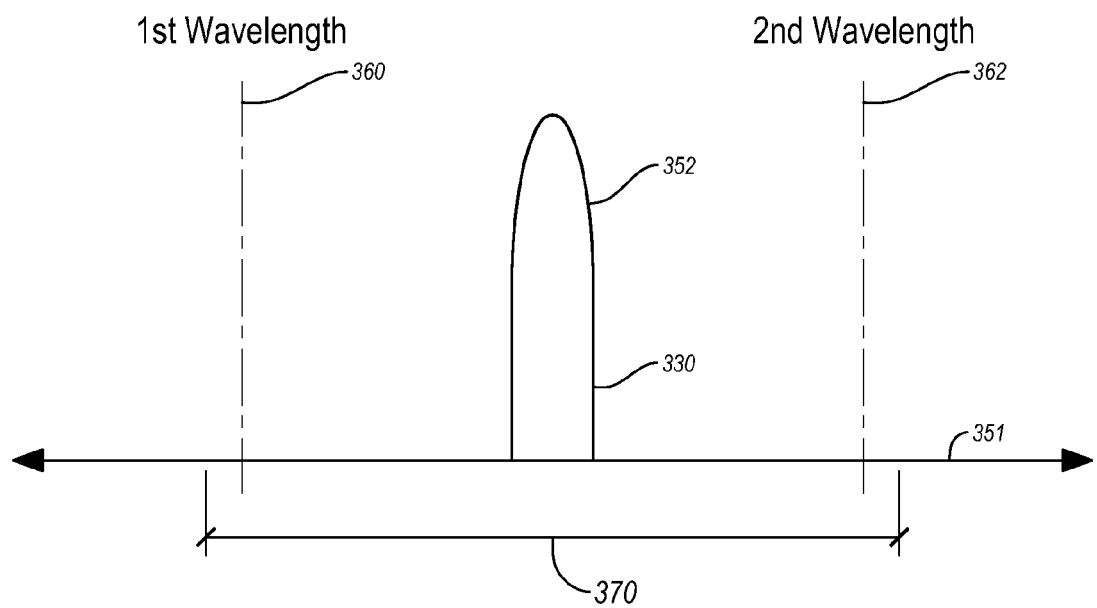

When the carrier wavelength of the optical signal 330 is tuned, the carrier wavelength of the optical signal 330 shifts continuously toward a second wavelength 362. FIG. 3C illustrates the optical signal 330 being shifted toward the second wavelength 362, arranged in accordance with at least some embodiments described herein. In these and other embodiments, when the carrier wavelength of the optical signal 330 is tuned from the first wavelength 360 to the second wavelength 362, the optical pass-through bandwidth 370 of the optical node 340 is enlarged to encompass the wavelength range between the first and second wavelengths 360, 362. With the optical pass-through bandwidth 370 encompassing the wavelengths between the first and second wavelengths 360, 362, the optical node 340 passes the optical signal 330 as it is tuned so that the optical signal 330 is not attenuated or filtered by the optical node 340. After the carrier wavelength of the optical signal 330 is tuned to the second wavelength 362, the optical pass-through bandwidth 370 may be reduced to pass the optical signal 330 at the second wavelength 362 but not the first wavelength 360.

Figure 3D:
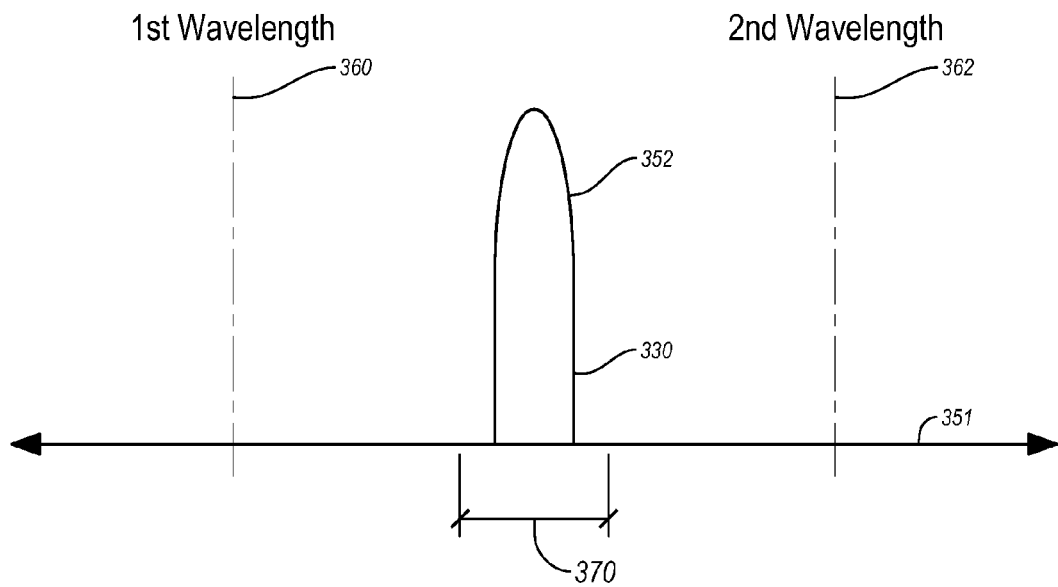

FIG. 3D illustrates the optical signal 330 being shifted toward the second wavelength 362, arranged in accordance with at least some embodiments described herein. In these and other embodiments, when the carrier wavelength of the optical signal 330 is tuned, the width of the optical pass-through bandwidth 370 of the optical node 340 is maintained. Thus, the amount of the optical spectrum 351 encompassed by the optical pass-through bandwidth 370 is maintained during tuning. However, the location of the optical pass-through bandwidth 370 within the optical spectrum 351 may be adjusted to maintain the carrier wavelength of the optical signal 330 within the optical pass-through bandwidth 370 as the carrier wavelength of the optical signal 330 is tuned. In some embodiments, optical pass-through bandwidth 370 may be adjusted at a rate equal or substantially equal to a rate of tuning of the carrier wavelength of the optical signal 330. By adjusting the location of the optical pass-through bandwidth 370 in the optical spectrum 351 at the same or substantially the same rate as the rate of tuning of the carrier wavelength of the optical signal 330, the carrier wavelength of the optical signal 330 is maintained in the optical pass-through bandwidth 370 as it is tuned so that the optical signal 330 is not attenuated or filtered by the optical node 340.

Figure 3E:
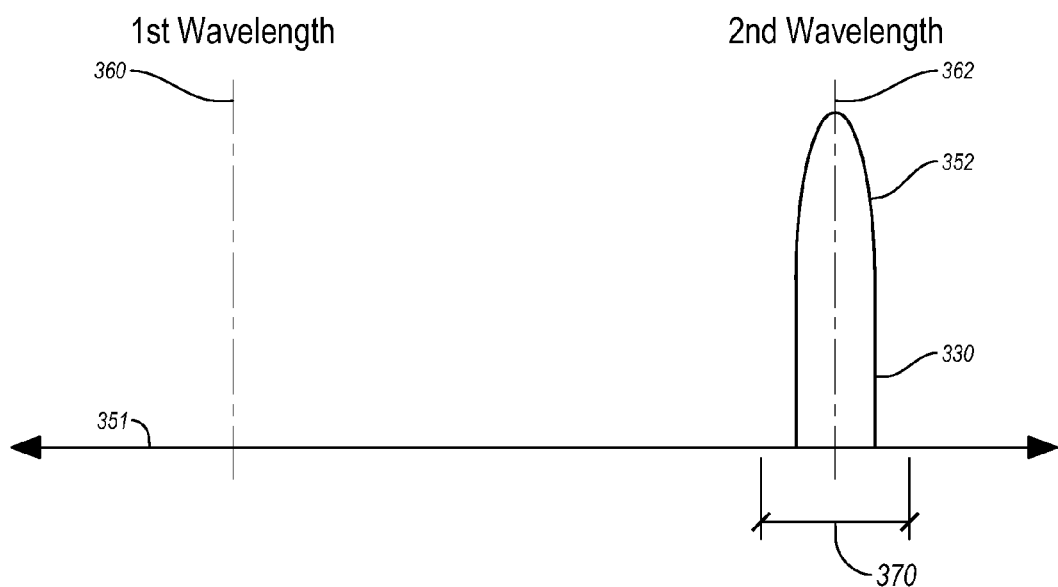

FIG. 3E illustrates the carrier wavelength of the optical signal 330 at the second wavelength 362, arranged in accordance with at least some embodiments described herein. In these and other embodiments, after the optical signal 330 is tuned and reassigned to the second wavelength 362, the optical pass-through bandwidth 370 of the optical node 340 may encompass the wavelength range used by the optical signal 330, but may filter or attenuate the first wavelength 360. Alternately or additionally, the optical pass-through bandwidth 370 may filter or attenuate the first wavelength 360 as well as portions of the wavelength range between the first wavelength 360 and the second wavelength 362 and wavelengths above the second wavelength 362.

In some embodiments, the transmitter 310 and receiver 320 may be included within an optical source node and/or optical destination node, respectively. In these and other embodiments, the optical source node and/or optical destination node may include a tunable filter or VB-WSS. The optical pass-through bandwidth of the tunable filter or VB-WSS may be controlled in a manner similar to the optical pass-through bandwidth of the optical node 340 so that the optical signal 330 is not attenuated as the carrier wavelength of the optical signal 330 is reassigned.

Referring again to FIG. 3A, in some embodiments, the network controller 350 may communicate with the optical node 340, the transmitter 310, and/or the receiver 320 over a wired network or over a wireless network. Alternately or additionally, the network controller 350 may communicate with the optical node 340, the transmitter 310, and/or the receiver 320 using the same or different modes of communication. In some embodiments, the network controller 350 may direct the receiver 320 to adjust a wavelength of a reference optical signal within the receiver 320 based on the reassignment of the wavelength of the optical signal 330. In some embodiments, the network controller 350 may not control the transmitter 310. In these and other embodiments, the transmitter 310 may send signals to the network controller 350 indicating the changing carrier wavelength of the optical signal 330 and the network controller 350 may direct the optical node 340 based on the received signals from the transmitter 310. In some embodiments, the network controller 350 may include a processor, microprocessor, field programmable gate array (FPGA), or other logic circuits or modules. In these and other embodiments, the network controller 350 may operate according to a set of computer-executable instructions to perform the functions described herein.

Alternately or additionally, the optical network 300 may not include the network controller 350. In these and other embodiments, the transmitter 310 may send updates of the wavelength of the optical signal 330 directly to the optical node 340. In other embodiments, the optical node 340 may detect a change in wavelength of the optical signal 330 as the carrier wavelength of the optical signal 330 is tuned and adjust its optical pass-through bandwidth accordingly.

In some embodiments, the optical node 340 may include a tunable filter or a VB-WSS. Alternately or additionally, the number of optical nodes in the optical network 300 may be more than one. In these and other embodiments, the network controller 350 may control the receiver 320 and/or all of or a subset of the optical nodes within the optical network 300 and direct all of or a subset of the optical nodes to adjust their optical pass-through bandwidths accordingly to the carrier wavelength of the optical signal 330. In some embodiments, the optical network 300 may be an optical fiber network that uses optical fibers as the medium for transmitting the optical signal 330.

Figure 4A:
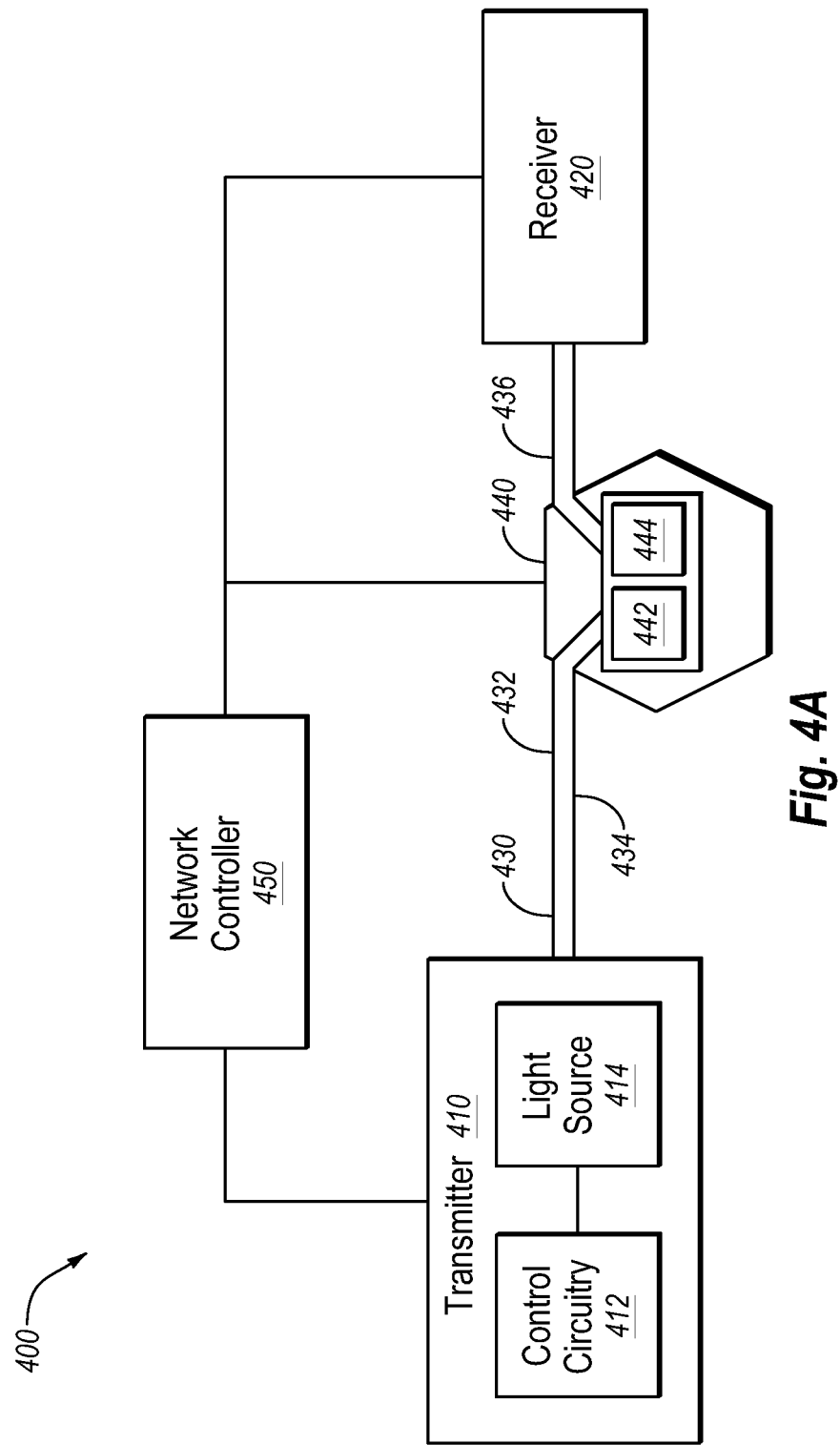
FIG. 4A is a block diagram of another example optical network for reassigning a carrier wavelength of an optical signal.

FIG. 4A is a block diagram of another example optical network 400 for reassigning a wavelength of an optical signal 430, arranged in accordance with at least some embodiments described herein. The optical network 400 may include various optical nodes, including but not limited to, a transmitter 410, a receiver 420, an optical wavelength converter 440, and a network controller 450. An optical path 432 may be formed between the transmitter 410 and the receiver 420 through the optical wavelength converter 440 along which the optical signal 430 may travel. The optical path 432 may have a first link 434 between the transmitter 410 and the optical wavelength converter 440 and a second link 436 between the optical wavelength converter 440 and the receiver 420. In some embodiments, the transmitter 410 may include control circuitry 412 and a light source 414. The light source 414 may be configured to produce the optical signal 430 under the control of the control circuitry 412.

In some embodiments, the network controller 450 may be configured to direct the transmitter 410 to tune a carrier wavelength of the optical signal 430 from a first wavelength to a second wavelength to reassign the carrier wavelength of the optical signal 430 within the optical network 400. Alternately or additionally, the receiver 420 may be configured to receive the optical signal 430 and demodulate the optical signal 430 to obtain a data signal. In some embodiments, the transmitter 410 and the receiver 420 may be transceivers, transponders, or some combination thereof.

The optical wavelength converter 440 may convert the carrier wavelength of the optical signal 430 received from the transmitter 410 to another wavelength and send the optical signal 430 at the other wavelength to the receiver 420. In some embodiments, the optical wavelength converter may be in an optical node. The carrier wavelength of the optical signal 430 on the first link 434 of the optical path 432 may differ from the carrier wavelength of the optical signal 430 on the second link 436 of the optical path 432.

In some embodiments, the optical wavelength converter 440 may convert the carrier wavelength of the optical signal 430 using first and second pumps 442, 444. In some embodiments, the optical converter 440 may be an all-optical wavelength converter 440. More specifically, in these and other embodiments, the optical wavelength converter 440 may convert the carrier wavelength of the optical signal 430 using a combination of sum wavelength generation and difference wavelength generation implemented using the first and second pumps 442, 444, the optical signal 430 in the first link 434, and the optical signal 430 in the second link 436. In some embodiments, all-optical wavelength conversion may be achieved based on four-wave mixing. The relation between the carrier wavelength of the optical signal 430 in the first and second links 434, 436 and the pumps 442, 444 may be expressed based on a carrier frequency of the optical signal 430 that is based on the carrier wavelength of the optical signal 430. For example, the relation between the carrier frequency of the optical signal 430 in the first link 434 ($W_{s1}$), the carrier frequency of the optical signal 430 in the second link 436 ($W_{s2}$), the optical frequency of the first pump 442 ($W_{p1}$), and the optical frequency of the second pump 444 ($W_{p2}$) may be:

$$W_{s2}=(W_{s1}+W_{p1})-W_{p2}.$$

In some embodiments, the optical wavelength converter 440 may contain a tunable filter with an adjustable optical bandwidth. The tunable filter may adjust its optical bandwidth to allow the carrier wavelength of the optical signal 430 in the second link 436 to pass while filtering the carrier wavelength of the optical signal 430 in the first link 434, the wavelength of the first pump 442, and the wavelength of the second pump 444.

Figure 4B:
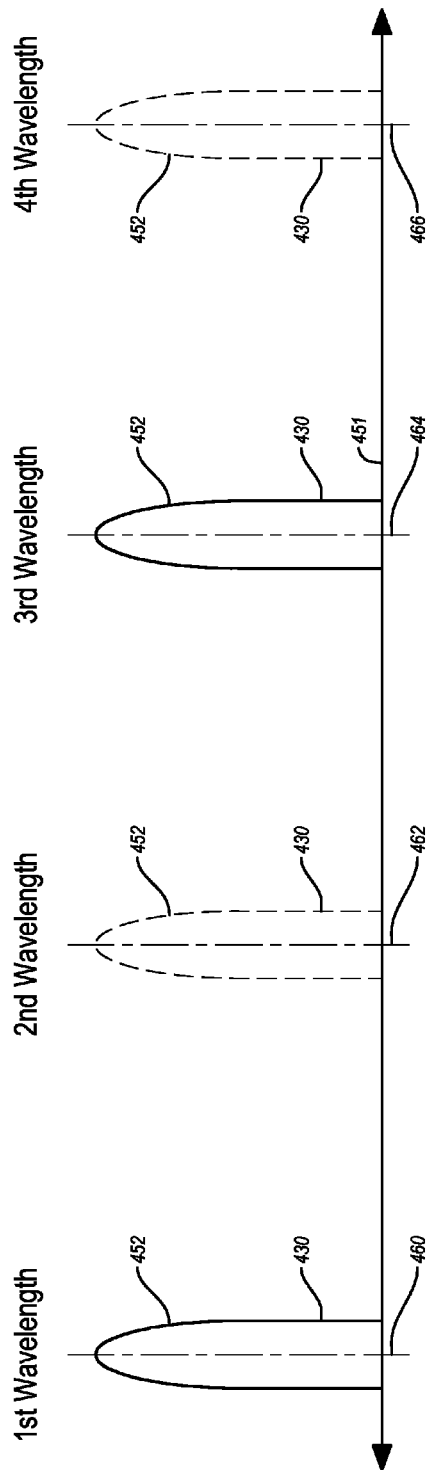
FIG. 4B illustrates the reassignment of the carrier wavelength of the optical signal of FIG. 4A in an optical spectrum.

FIG. 4B illustrates the reassignment of the carrier wavelength of the optical signal 430 of FIG. 4A in an optical spectrum 451, arranged in accordance with at least some embodiments described herein. As illustrated in FIG. 4B, before the carrier wavelength of the optical signal 430 is tuned, in the first link 434 the optical signal 430 may have a carrier wavelength at a first wavelength 460. In the second link 436, the carrier wavelength of the optical signal 430 may be a third wavelength 464. In some embodiments, the optical signal 430 may have a spectral width as illustrated by an optical signal spectrum 452.

As the transmitter 410 tunes the carrier wavelength of the optical signal 430, the carrier wavelength of the optical signal 430 in the first link 434 moves in continuous fashion toward a second wavelength 462. After being tuned to the second wavelength 462, the carrier wavelength of the optical signal 430 in the first link 434 is equal to the second wavelength 462. Additionally, as the transmitter 410 tunes the carrier wavelength of the optical signal 430, the carrier wavelength of the optical signal 430 in the second link 436 moves in continuous fashion toward a fourth wavelength 466. After being tuned to the fourth wavelength 466, the carrier wavelength of the optical signal 430 in the second link 436 is equal to the fourth wavelength 466.

Referring again to FIG. 4A, the optical wavelength converter 440 may tune the wavelength of the first and/or second pumps 442, 444 according to a continuous function. For example, the carrier wavelength of the optical signal 430 in the first link 434 may remain constant while the carrier wavelength of the optical signal 430 in the second link 436 is reassigned. In these and other embodiments, the optical wavelength converter 440 may tune the wavelength of the first and/or second pumps 442, 444 to tune the carrier wavelength of the optical signal 430 and thereby reassign the carrier wavelength of the optical signal 430 in the second link 436 while the transmitter 410 maintains the carrier wavelength of the optical signal 430 in the first link 434 constant. Alternately or additionally, the optical wavelength converter 440 and the transmitter 410 may both tune the carrier wavelength of the optical signal 430, resulting in reassigning both of the carrier wavelengths of the optical signal 430 in the first and second links 434, 436. In some embodiments, the network controller 450 may direct the optical wavelength converter 440 to tune the wavelength of the first and/or second pumps 442, 444.

In some embodiments, one or both of the pumps 442, 444 may be may be a tunable laser. Alternately or additionally, one or both of the pumps 442, 444 may be a mode-hop-free tunable laser.

In some embodiments, the optical network 400 may include one or more optical nodes in addition to the optical wavelength converter 440. The optical nodes may have tunable filters, VB-WSS, and/or other optical wavelength converters. In these and other embodiments, the tunable filters and VB-WSSs may have adjustable optical pass-through bandwidths. In some embodiments, the network controller 450 may control one or more of the optical nodes and/or the receiver 420. The network controller 450 may control the one or more optical nodes that have tunable filters or VB-WSSs by adjusting their optical pass-through bandwidths accordingly to the carrier wavelength of the optical signal 430. In some embodiments, the optical network 400 may be an optical fiber network that uses optical fibers as the medium for transmitting the optical signal 430.

Figure 5:
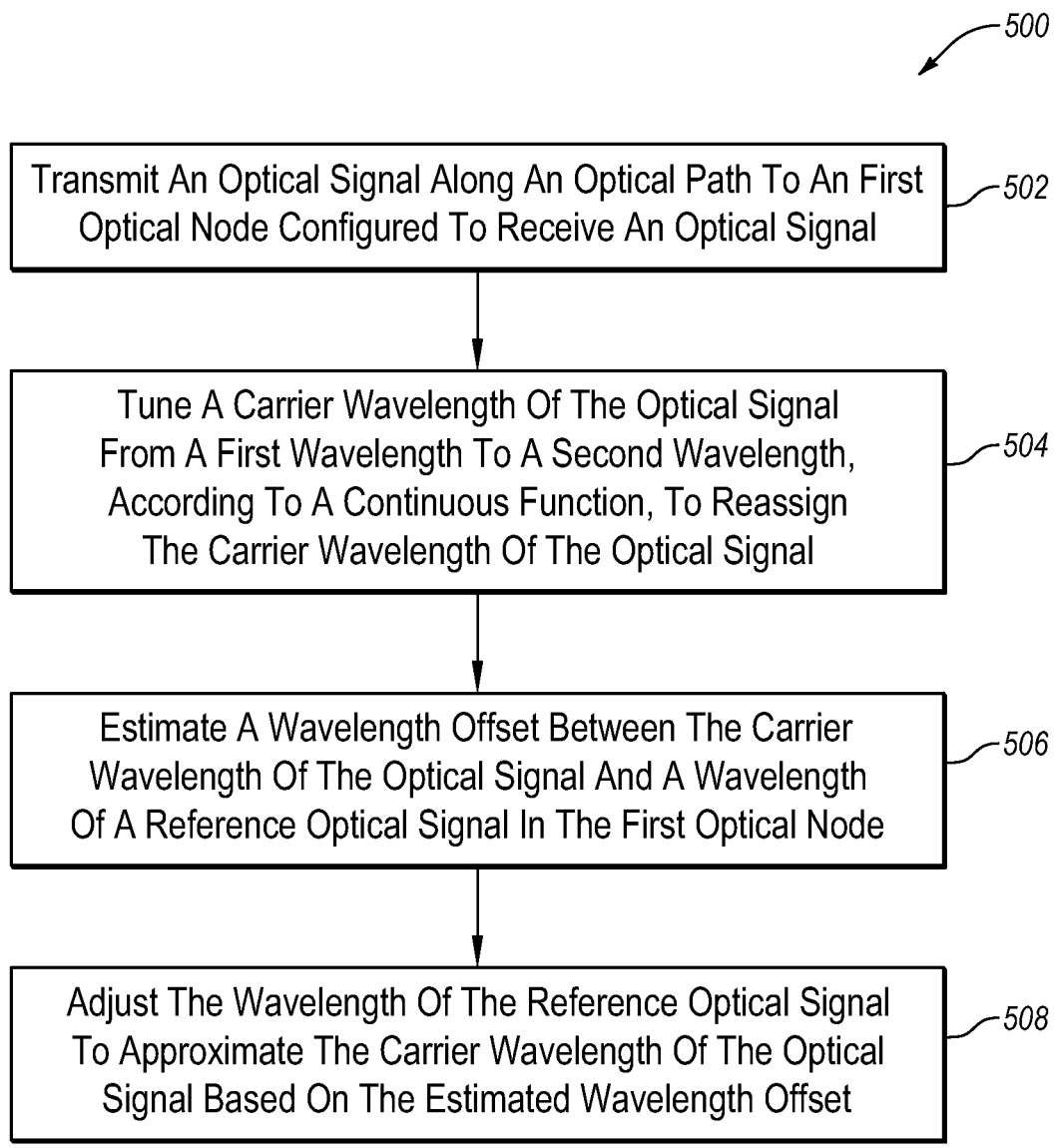
FIG. 5 is a flowchart of an example method of carrier wavelength reassignment of an optical signal, all arranged in accordance with at least some embodiments described herein.

FIG. 5 is a flowchart of an example method 500 of wavelength reassignment of an optical signal, arranged in accordance with at least some embodiments described herein. The method 500 may be implemented, in some embodiments, by an optical network, such as the optical network 100 of FIG. 1A, the optical network 300 of FIG. 3A, and/or the optical network 400 of FIG. 4A.

The method 500 may begin at block 502, in which an optical signal may be transmitted along an optical path to a first optical node configured to receive an optical signal. In some embodiments, the first optical node may be a transceiver or transponder. Alternately or additionally, the optical signal may pass through one or more optical nodes along the optical path. For example, in some embodiments, the optical signal may pass through a filter, a tunable filter, a WSS, a VB-WSS, and/or an optical wavelength converter. Alternately or additionally, the optical signal received by the first optical node may be generated by an optical wavelength converter. In some embodiments, the optical path may be along optical fibers within an optical fiber network.

In block 504, a carrier wavelength of the optical signal may be tuned from a first wavelength to a second wavelength, according to a continuous function, to reassign the carrier wavelength of the optical signal. In some embodiments, reassigning the carrier wavelength of the optical signal may include changing the carrier wavelength of the optical signal from the first wavelength to the second wavelength so that another optical signal may use the first wavelength along the optical path. Alternately or additionally, tuning the carrier wavelength of the optical signal according to a continuous function may cause the carrier wavelength of the optical signal to continuously traverse the wavelengths between the first wavelength and the second wavelength.

In some embodiments, the carrier wavelength of the optical signal may be tuned, and thus reassigned, for a portion of the optical path along which the optical signal travels. Alternately or additionally, the carrier wavelength of the optical signal may be tuned differently for different portions of the optical path. For example, if the optical path contained an optical wavelength converter, the first portion of the optical path between a transmitter and the optical wavelength converter may be tuned by the transmitter at a first rate to the second wavelength. A second portion of the optical path between the optical wavelength converter and the second optical node may be tuned by the optical wavelength converter at a second rate to a fourth wavelength. In some embodiments, the carrier wavelength of the optical signal may be tuned by tuning a tunable light source, such as a tunable laser. Alternately or additionally, the tunable laser may be a mode-hop-free tunable laser.

In block 506, a frequency offset or wavelength offset between the carrier wavelength of the optical signal and a wavelength of a reference optical signal in the receiver may be estimated. In some embodiments, the frequency offset may be determined by mixing the optical signal with the reference optical signal in a complex-field space, converting the mixed optical signal to electrical signals, and analyzing the electrical signals. In some embodiments, the frequency offset may be estimated using digital signal processing in the receiver.

In block 508, the wavelength of the reference optical signal may be adjusted to approximate the carrier wavelength of the optical signal based on the estimated frequency offset. By adjusting the reference optical signal to approximate the carrier wavelength of the optical signal, the wavelength of the reference optical signal may be tuned at the same or substantially the same rate as the carrier wavelength of the optical signal. By tuning the wavelength of the reference optical signal and the carrier wavelength of the optical signal at the same or substantially the same rate, the optical signal may be demodulated with reduced or no data loss or data interruption.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, the method 500 may further include adjusting an optical pass-through bandwidth of an optical node disposed in the optical path based on the carrier wavelength of the optical signal. In some embodiments, adjusting the optical pass-through bandwidth of the optical node may include adjusting the optical pass-through bandwidth to pass wavelengths between the first and second wavelengths. Alternately or additionally, adjusting the optical pass-through bandwidth of the optical node may include adjusting the optical pass-through bandwidth to maintain the carrier wavelength of the optical signal within the optical pass-through bandwidth while the carrier wavelength of the optical signal is tuned. In some embodiments, after the optical signal is tuned to the second wavelength, the optical pass-through bandwidth of the optical node may pass the second wavelength and filter the first wavelength.

In some embodiments, the method 500 may further include demodulating the optical signal using the reference optical signal. In some embodiments, the optical signal may be modulated with a data signal. For example, the amplitude, phase, or both of the optical signal may be modulated with the data signal. In some embodiments, the modulation formats may include differential phase-shift keying, on-off keying, binary phase-shifting keying, quadrature phase-shift keying, offset quadrature phase-shift keying, dual polarization quadrature phase-shift keying, M-ary quadrature amplitude modulation, orthogonal frequency division multiplexing, among others.

In some embodiments, the method 500 may further include setting the wavelength of the reference optical signal to approximate the carrier wavelength of the optical signal before tuning the carrier wavelength of the optical signal. Alternately or additionally, the wavelength of the reference optical signal may be maintained at approximately the carrier wavelength of the optical signal as the carrier wavelength of the optical signal is tuned from the first wavelength to the second wavelength.

In some embodiments, the method 500 may further include adjusting multiple carrier wavelengths simultaneously. In some embodiments, multiple carrier wavelengths may within a single channel within an optical network. In these and other embodiments, all of or a subset of the carrier wavelengths within the channel may be reassigned simultaneously.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise tangible computer-readable including RAM, ROM, EEPROM, CD-ROM or other optical disk storage, magnetic disk storage or other magnetic storage devices, or any other medium which may be used to carry or store desired program code means in the form of computer-executable instructions or data structures and which may be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. An optical network for reassigning a wavelength of an optical signal, the optical network comprising:
    a first optical node configured to transmit an optical signal along an optical path, the first optical node configured to tune a carrier wavelength of the optical signal from a first wavelength to a second wavelength, according to a continuous function, to reassign the carrier wavelength of the optical signal; and
    a second optical node configured to receive the optical signal, the second optical node including a feedback loop configured to adjust a wavelength of a reference optical signal at a same or substantially the same rate as the carrier wavelength of the optical signal is tuned by the first optical node in order to approximate the carrier wavelength of the optical signal.

2. The optical network of claim 1, further comprising a third optical node disposed in the optical path between the first optical node and the second optical node, wherein an optical pass-through bandwidth of the third optical node is configured to be adjusted based on the carrier wavelength of the optical signal.

3. The optical network of claim 2, wherein the third optical node comprises a tunable filter, a variable-bandwidth wavelength selective switch, or an optical wavelength converter.

4. The optical network of claim 1, wherein each of the first optical node and the second optical node comprises a transceiver or a transponder.

5. The optical network of claim 1, wherein the first optical node comprises an optical wavelength converter.

6. The optical network of claim 5, further comprising a third optical node disposed in the optical path so that the first optical node is between the third optical node and the second optical node, wherein the third optical node is configured to transmit the optical signal to the optical wavelength converter with the carrier wavelength of the optical signal equal to a third wavelength.

7. The optical network of claim 6, wherein the third optical node is configured to tune the carrier wavelength of the optical signal from the third wavelength to a fourth wavelength, according to the continuous function, to reassign the wavelength of the optical signal between the third optical node and the first optical node.

8. The optical network of claim 1, wherein tuning the carrier wavelength of the optical signal according to the continuous function causes the carrier wavelength to traverse a wavelength range between the first wavelength and the second wavelength.

9. A method of wavelength reassignment of an optical signal, the method comprising:
    transmitting an optical signal along an optical path to a first optical node configured to receive an optical signal;
    tuning a carrier wavelength of the optical signal from a first wavelength to a second wavelength, according to a continuous function, to reassign the carrier wavelength of the optical signal;
    estimating a frequency offset between the carrier wavelength of the optical signal and a wavelength of a reference optical signal in the first optical node; and
    adjusting the wavelength of the reference optical signal at a same or substantially the same rate as the carrier wavelength of the optical signal is tuned by the first optical node in order to approximate the carrier wavelength of the optical signal based on the estimated frequency offset.

10. The method of claim 9, further comprising adjusting an optical pass-through bandwidth of a second optical node disposed in the optical path based on the carrier wavelength of the optical signal.

11. The method of claim 10, wherein adjusting the optical pass-through bandwidth of the second optical node includes adjusting the optical pass-through bandwidth to pass wavelengths between the first and second wavelengths.

12. The method of claim 10, wherein adjusting the optical pass-through bandwidth of the second optical node includes adjusting the optical pass-through bandwidth to maintain the carrier wavelength of the optical signal within the optical pass-through bandwidth while the carrier wavelength of the optical signal is tuned.

13. The method of claim 9, further comprising demodulating the optical signal using the reference optical signal.

14. The method of claim 9, wherein the carrier wavelength of the optical signal is tuned for a portion of the optical path.

15. The method of claim 9, wherein the wavelength of the reference optical signal is maintained at approximately the carrier wavelength of the optical signal as the carrier wavelength of the optical signal is tuned from the first wavelength to the second wavelength.

16. A system for reassigning a wavelength of an optical signal within an optical network, the system comprising:
    a first optical node configured to transmit an optical signal along an optical path, the first optical node configured to tune a carrier wavelength of the optical signal from a first wavelength to a second wavelength according to a continuous function;
    a second optical node configured to receive the optical signal, the second optical node comprising a reference controller configured to adjust a wavelength of a reference optical signal at a same or substantially the same rate as the carrier wavelength of the optical signal is tuned by the first optical node in order to approximate the carrier wavelength of the optical signal;
    a third optical node disposed in the optical path between the first and second optical nodes, the third optical node having an adjustable optical pass-through bandwidth; and
    a network controller configured to direct the first optical node to tune the carrier wavelength of the optical signal to the second wavelength and to direct the third optical node to adjust the optical pass-through bandwidth of the optical node based on the carrier wavelength of the optical signal.

17. The system of claim 16, wherein the network controller is configured to adjust the optical pass-through bandwidth of the third optical node to pass wavelengths between the first and second wavelengths while the carrier wavelength of the optical signal is tuned and, after the carrier wavelength of the optical signal is tuned to the second wavelength, adjusts the optical pass-through bandwidth of the third optical node to pass the second wavelength and filter the first wavelength.

18. The system of claim 16, wherein the network controller is configured to adjust the optical pass-through bandwidth of the third optical node to maintain the carrier wavelength of the optical signal within the optical pass-through bandwidth while the carrier wavelength of the optical signal is tuned, wherein, after the carrier wavelength of the optical signal is tuned to the second wavelength, the optical pass-through bandwidth of the third optical node is configured to pass the second wavelength and to filter the first wavelength.

19. The system of claim 16, wherein the third optical node comprises a tunable filter or a variable-bandwidth wavelength selective switch.

20. The system of claim 16, wherein the network controller is configured to direct the reference controller configured to adjust the wavelength of the reference optical signal.

* * * * *